(12) United States Patent
Lee et al.

(10) Patent No.: US 11,577,349 B2
(45) Date of Patent: Feb. 14, 2023

(54) METHOD OF FORMING A JOURNAL FOR A ROLLER CONE DRILL BIT

(71) Applicant: Halliburton Energy Services, Inc., Houston, TX (US)

(72) Inventors: Young Ho Lee, Conroe, TX (US); Micheal Burl Crawford, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/797,669

(22) Filed: Feb. 21, 2020

(65) Prior Publication Data

US 2020/0190910 A1 Jun. 18, 2020

Related U.S. Application Data

(62) Division of application No. 15/738,169, filed as application No. PCT/US2015/041230 on Jul. 21, 2015, now abandoned.

(51) Int. Cl.
| | |
|---|---|
| B23P 15/32 | (2006.01) |
| B21K 5/02 | (2006.01) |
| F16C 17/02 | (2006.01) |
| E21B 10/08 | (2006.01) |
| E21B 10/22 | (2006.01) |

(52) U.S. Cl.
CPC .............. B23P 15/32 (2013.01); B21K 5/02 (2013.01); E21B 10/08 (2013.01); E21B 10/22 (2013.01); F16C 17/02 (2013.01); *F16C 2352/00* (2013.01)

(58) Field of Classification Search
CPC ...... E21B 10/22; F16C 17/02; F16C 2352/00; B21K 5/02; B23P 15/32

USPC .............................................. 76/108.1–108.6
See application file for complete search history.

(56) References Cited

U.S. PATENT DOCUMENTS

| | | |
|---|---|---|
| 1,967,821 A | 7/1934 | Hess |
| 2,849,261 A | 8/1958 | Bjerre |
| 3,262,185 A | 7/1966 | Homigold |
| 3,480,341 A | 11/1969 | Hickemell |
| 3,801,171 A | 4/1974 | Rozentals |
| 3,923,348 A | 12/1975 | Peck |
| 3,960,419 A | 6/1976 | Brawley |
| 4,213,656 A | 7/1980 | Olschewski et al. |
| 4,258,806 A | 3/1981 | Kunkel et al. |

(Continued)

FOREIGN PATENT DOCUMENTS

| | | |
|---|---|---|
| CA | 2711804 | 7/2005 |
| CN | 101776203 | 7/2010 |

(Continued)

OTHER PUBLICATIONS

International Search Report and Written Opinion for PCT Patent Application No. PCT/US2015/041230, dated May 16, 2016; 13 pages.

(Continued)

*Primary Examiner* — Jason Daniel Prone
(74) *Attorney, Agent, or Firm* — Thomas Rooney; C. Tumey Law Group PLLC

(57) ABSTRACT

The present disclosure relates to roller cone drill bit journals with asymmetric ball races and extended friction races. The disclosure also relates to methods of forming such journals, and methods of finishing these journals to produce finished journals with symmetric ball races.

10 Claims, 6 Drawing Sheets

(56) References Cited

U.S. PATENT DOCUMENTS

| | | |
|---|---|---|
| 4,819,517 A | 4/1989 | Vezirian |
| 4,911,255 A | 3/1990 | Pearce |
| 5,137,097 A | 8/1992 | Fernandez |
| 7,246,947 B2 | 7/2007 | Thompson |
| 7,607,837 B2 | 10/2009 | Niebling et al. |
| 7,621,346 B1 | 11/2009 | Trinh et al. |
| 8,356,398 B2 | 1/2013 | McCoimick et al. |
| 2009/0014217 A1 | 1/2009 | Zahradnik et al. |
| 2009/0194339 A1 | 8/2009 | Dick et al. |
| 2009/0272582 A1* | 11/2009 | McCormick ............ E21B 10/14 175/336 |
| 2013/0182988 A1* | 7/2013 | Dahlman ................. F16C 33/64 384/569 |
| 2014/0339093 A1 | 11/2014 | Lancaster-Larocque et al. |
| 2015/0258628 A1 | 9/2015 | Flak et al. |
| 2018/0195347 A1* | 7/2018 | Lee ......................... B23P 15/32 |

FOREIGN PATENT DOCUMENTS

| | | |
|---|---|---|
| WO | 1999/002873 | 1/1999 |
| WO | 02/35051 | 5/2002 |

OTHER PUBLICATIONS

Varel International, "Challenger TCI Sealed Journal Bearing Bits For Sizes up to 13 3/4.", Retrieved from url: http://www.varelintl.com/Oil-and-Gas-Home/Roller-Cone-Drill-Bits/Tungsten-Carbide-Insert-TCI-Bits/Sealed-Journal-Bearing-Bits/, Oct. 24, 2014; 1 page.

International Preliminary Report on Patentability for PCT Patent Application No. PCT/US2015/041230, dated Feb. 1, 2018; 9 pages.

Office Action for Chinese Patent Application No. 201580080827.0, dated Oct. 31, 2018; 15 pages.

Office Action for Chinese Patent Application No. 201580080827.0, dated Jun. 18, 2019; 7 pages.

\* cited by examiner

METHOD OF FORMING A JOURNAL FOR A ROLLER CONE DRILL BIT

RELATED APPLICATIONS

This application is a Divisional Application of U.S. application Ser. No. 15/738,169 filed Dec. 20, 2017, which is a U.S. National Stage Application of International Application No. PCT/US2015/041230 filed Jul. 21, 2015, which designates the United States.

TECHNICAL FIELD

The present disclosure relates to roller cone drill bit journals, methods of forming journals, and method of finishing journals.

BACKGROUND

Roller cone drill bits are used to form wellbores through formations in the earth in order to access downhole materials, such as petrochemical deposits. Roller cone drill bits are typically formed in a primary shape using a machining process, resulting in a bit body. The bits are then finished by placing specialized materials in selected locations and by tooling, including machining, selected locations.

BRIEF DESCRIPTION OF THE DRAWINGS

A more complete and thorough understanding of the present embodiments and advantages thereof may be acquired by referring to the following description taken in conjunction with the accompanying drawings, which are not to scale, in which like reference numbers indicate like features, and wherein.

DETAILED DESCRIPTION

The present disclosure relates to roller cone drill bit journals having an extended friction race and an asymmetric ball race and a method of forming and further finishing this type of journal to produce a finished journal. The journal having an extended friction race and an asymmetric ball race may be a journal at any stage prior to the finished journal. For instance, it may be a journal that has not been heat-treated or a heat-treated journal that has not undergone other finishing processes.

Figure 1:
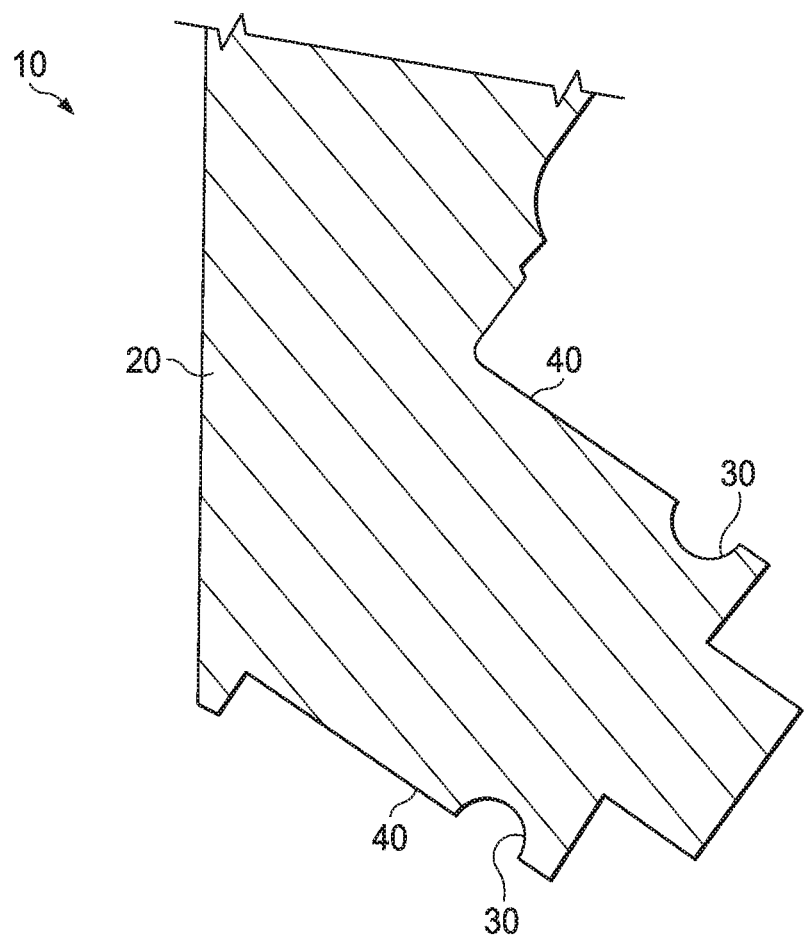
FIG. 1 is a schematic drawing in cross-section of a finished journal of a roller cone drill bit.
Figure 2:
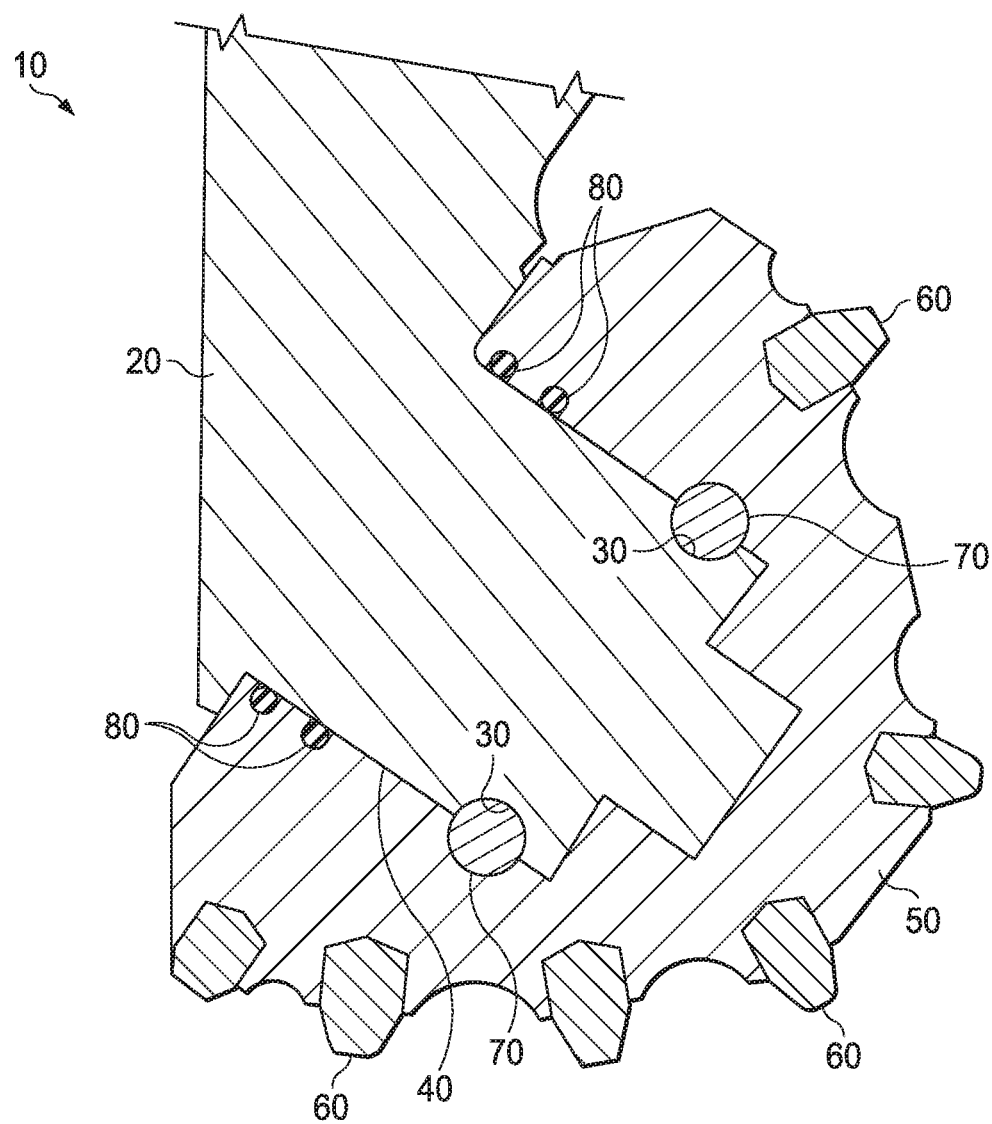
FIG. 2 is a schematic drawing in cross-section of the finished journal of FIG. 1 with a roller cone, also depicted in cross section, assembled on the journal.

A roller cone drill bit contains at least one arm 10, as shown in FIG. 1. This arm 10 includes a journal 20, with a ball race 30 and a friction race 40. Friction race 40 and ball race 30 are adjacent on journal 20. When arm 10 is fully assembled, as shown in FIG. 2, cone 50, which contains a plurality of cutting elements 60, is disposed on journal 20 so that it may rotate about journal 20 when the drill bit is in use. Retaining balls 70 are fitted into ball race 30 to retain cone 50 on journal 20. Friction race 40 is covered with a bearing material (not independently shown). Other functional features, exemplified by sealing rings 80 for a lubricant system (not otherwise shown), are also added depending on the overall bit design.

Journal 20 is first formed as a journal then finished prior to assembly with cone 50. Finishing often includes welding the bearing material to friction race 40. During this process, the weld pool sometimes spills off of friction race 40 into adjacent ball race 30, removing part of ball race 30 in the process. This damage to ball race 30 renders it unable to appropriately house retaining balls 70, particularly during use of the roller cone drill bit. As a result, the entire arm 10 with a damaged ball race 30 is discarded.

Figure 3A:
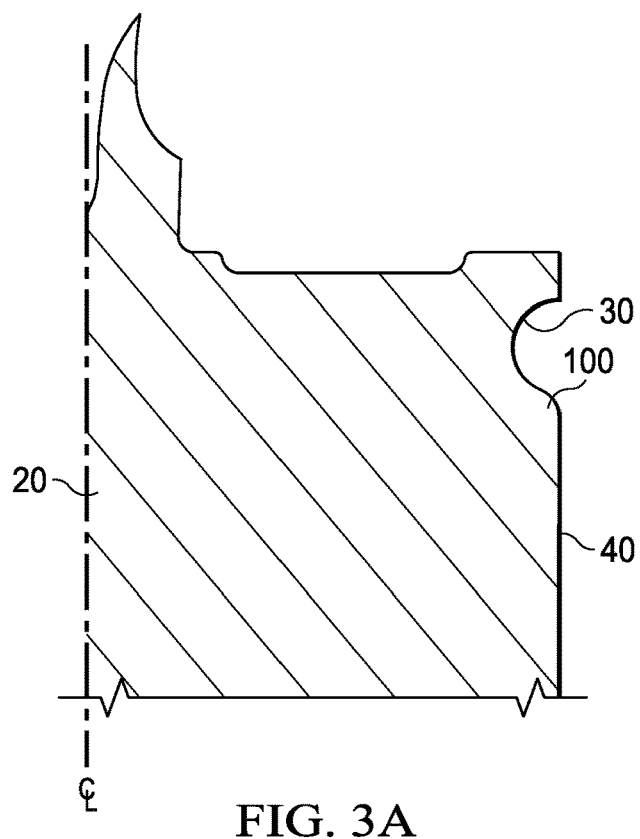
FIG. 3A is a schematic drawing in cross-section of a roller cone drill bit journal with an asymmetric ball race and an extended friction race.
Figure 3B:
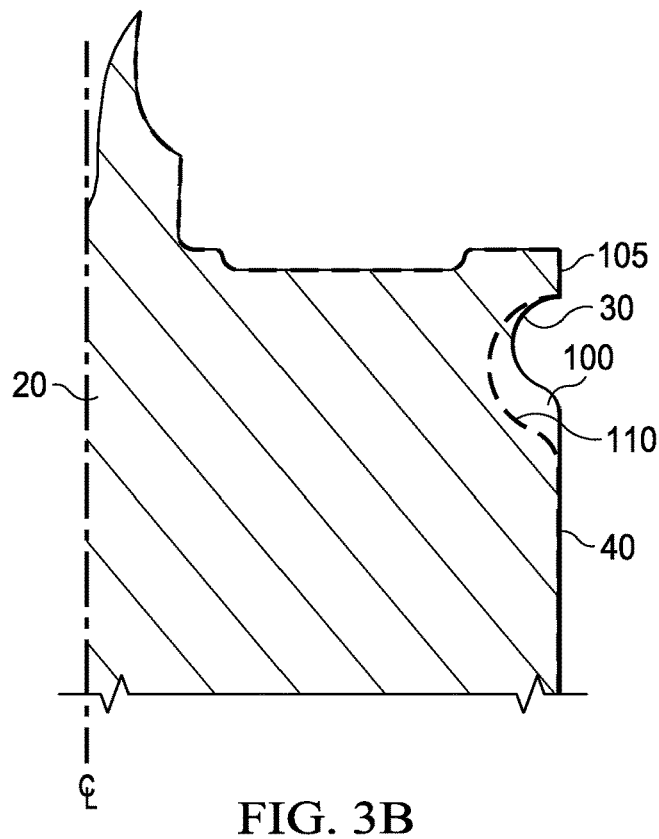
FIG. 3B is a schematic drawing in cross-section of the asymmetric roller cone drill bit journal of FIG. 3A superimposed over a conventional roller cone drill bit journal.

In the present disclosure, a journal friction race 40 is formed with a protuberance 100 that distorts ball race 30 into an asymmetric shape as shown in FIG. 3A. FIG. 3B illustrates how protuberance 100 of a journal of the present disclosure (solid line) 105 extends into the ball race 30 as compared to a conventional journal (dashed line) 110.

If the weld pool spills over from friction race 40, it encounters and damages protuberance 100. In most instances, this damage has no effect on the ability to produce a usable finished journal 20 because protuberance 100 (solid line) is later removed and is not present in the finished journal (dotted line), as may be seen in FIG. 3C.

In addition, because of decreased concerns about the weld pool spilling from friction race 40 into ball race 30, more bearing material may be applied to friction race 40. This additional bearing material may be applied to portions of friction race 40 that tend to experience more radial load or other stress during use of the drill bit.

Figure 3C:
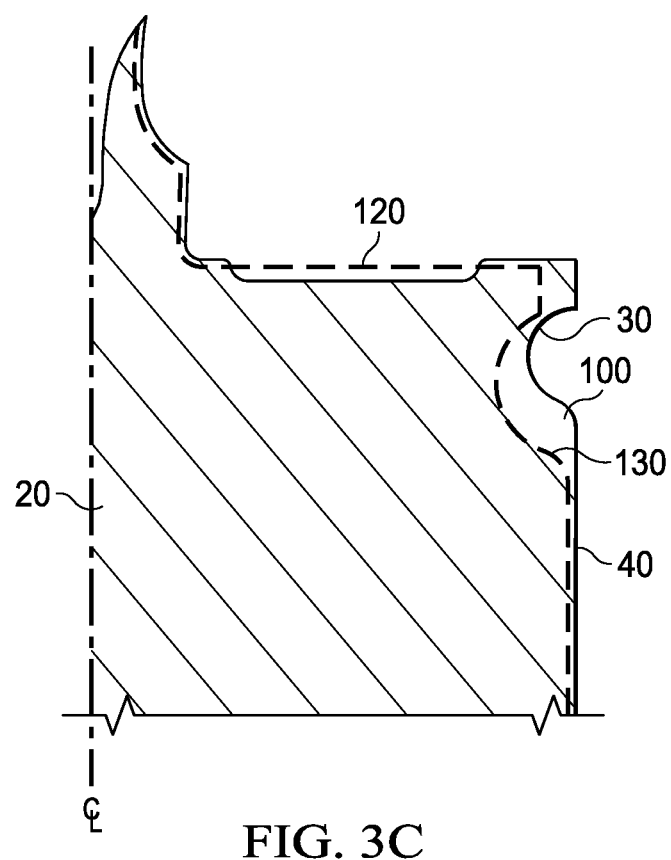
FIG. 3C is a schematic drawing in cross-section of a roller cone drill bit journal of FIG. 3A superimposed over the finished journal of FIG. 1.

Journal 20 is typically formed with arm 10 using conventional methods, such as machining. In such methods, a bit material is machined having the journal dimensions and configuration. They may also be formed in a multi-step process, such as when a first material is machined, then filled with a binder or infiltrant. Other materials that become integral with the bit may also be welded to the journal. In general, journal 20 and arm 10 may be formed from steel, a steel alloy, a matrix material, or other suitable bit material with suitable strength, toughness and machinability. The journal may be machined to form ball race 30 and protuberance 100. In order to finish the ball race and prevent the weld pool from damaging finished ball race 130, portions of journal 20 may be removed followed by removal of protuberances 100 from finished ball race 130, as shown in FIG. 3C.

Journal 20 is then finished prior to assembly with cone 50. The remainder of arm 10 may also be finished prior to assembly with cone 50, although some finishing of arm 10 may also occur after assembly with cone 50, so long as the cone does not interfere with later finishing.

In particular, a bearing material may be applied to friction race 40. This bearing material, typically when combined with other bearing material on cone 50, forms a bearing that facilitates rotation of cone 50 around journal 20 when the roller cone drill bit is in use. Suitable bearing materials include hard metals, such as metal borides, metal carbides, metal oxides, and metal nitrides. One common bearing material is tungsten carbide (WC or $W_2C$). The bearing material must be sufficiently attached to friction race 40 to withstand the radial load and other forces the bearing experiences during drill bit use. Typically, the bearing material is welded to friction race 40 using a welding material.

During the welding process, a portion of both the bearing material and friction race 40 are heated to their melting points. A molten welding material may also applied between them. The molten bearing material, friction rate, and welding material, if present, combine to form the weld pool, which coalesces as to cools, forming a strong bond between the bearing material and the friction race. Suitable welding materials may very depending on the composition of the friction race, the bearing material, and the welding material. For a steel friction race and a tungsten carbide bearing material a welding material with reduced friction and increased load capacity as compared to base steel may be used. For instance, an alloy containing cobalt, nickel, iron, aluminium, boron, carbon, chromium, manganese, molybdenum, phosphorus, sulfur, silicon, titanium, of mixtures thereof, such as a STELLITE® (Kennametal Stellite, Goshen, Ind.) alloy, may be used. The welding temperature is also determined by the melting point of the welded components and the welding material. Typical welding temperatures are between 700° F. and 1100° F.

During welding, the weld pool may expand onto protuberance 100, removing or damaging some of the protuberance material and, in some cases, replacing it with a different material. After welding, journal 20 is machined to final dimensions 120 as shown in FIG. 3C. During this machining process, any remaining portions of protuberance 100, including any damaged material, as well as any different replacement material are all removed to form finished ball race 130. This finished ball race 130 is symmetric and typically circular or ovoid in cross-section.

Although the exact dimensions of protuberance 100 may vary, it may extend into ball race 30 by up to 90% of the diameter of finished ball race 30. It may alternatively extend into ball race 30 by up to up to 75%, or up to 50%, up to 33%, up to 25%, or up to 10%, of the diameter of finished ball race 30. In order to ensure adequate protection of ball race 30, protuberance 100 may extent into ball race 30 by at least 0.05%, at least 0.1%, at least 1%, at least 5%, at least 10%, at least 25%, at least 33%, at least 50%, at least 75%, or at least 90% of the diameter of finished ball race 30.

Protuberance 100 may have a circular or ovoid cross-section, as shown in FIG. 3, or it may have an angled cross-section, such as a triangular cross-section, or any other shape that facilitates removal of journal 20 from any machining used to form it with ball race 30 and protuberance 100 intact.

In addition, because friction race 40 extends along with protuberance 100, the bearing material may be applied on or very close to protuberance 100. Bearing material on protuberance 100 may simply be removed during the machining process to form ball race 30. As a result, in finished journal 20, the bearing material may be present on friction race 40 substantially flush with ball race 30, or set back less than 0.1 inches, less than 0.05 inches, ore less than 0.01 inches from ball race 30.

Compared to a bit with no protuberance, protuberance 100 allows additional bearing material, such as additional wear resistant or anti-galling material, to be placed along all of the friction race of journal 20, or at least in an area of journal 20 adjacent protuberance 100 or in an area of journal 20 that that experiences concentrated stress or high wear. This may increase the wear resistance or other stress tolerance of the bearing as compared to similar bits in which there is no protuberance 100 on the journal 20. The additional bearing material may be at least 1% thicker, at least 10% thicker, at least 20% thicker, at least 30% thicker, at least 50% thicker, or at least 100% thicker than the bearing material in a bit with no protuberance.

Figure 4:
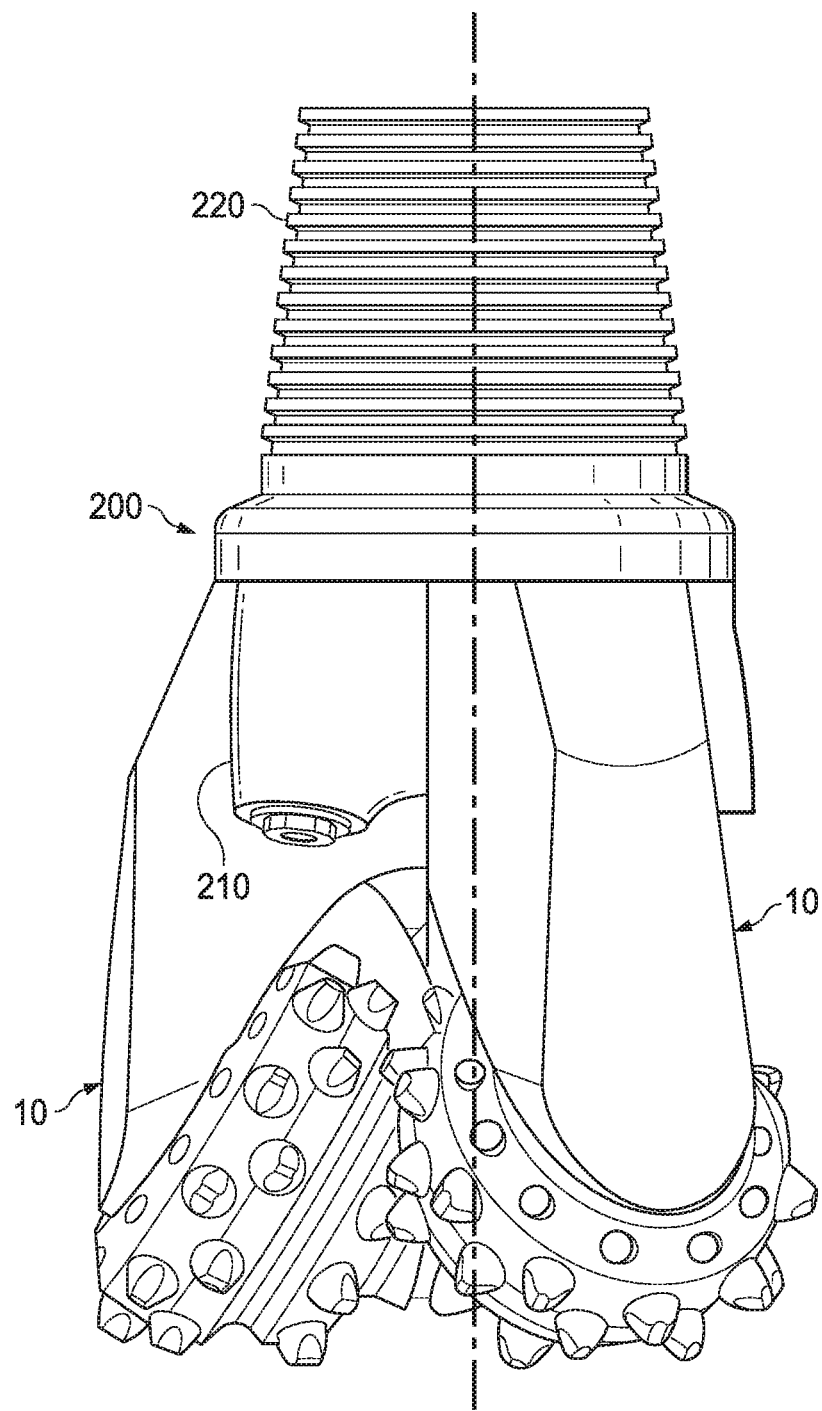
FIG. 4 is a schematic drawing in elevation showing a roller cone drill bit incorporating teachings of the present disclosure.

After journal 20 is finished, cone 50 may be assembled on it as shown in FIG. 2. by placing retaining balls 70 in ball race 30. Prior to or after cone 50 assembly, arm 10 may be attached to bit body 210 optionally along with one or a plurality of other arms 10 as shown in FIG. 4 to form a roller cone drill bit 200. Bit body 210 has a tapered, externally threaded, upper portion 230 satisfactory for use in attaching roller cone drill bit 200 with a drill string (as further described with respect to FIG. 5) to allow rotation of roller cone drill bit 200 in response to rotation of the drill string (as further described with respect to FIG. 5).

Figure 5:
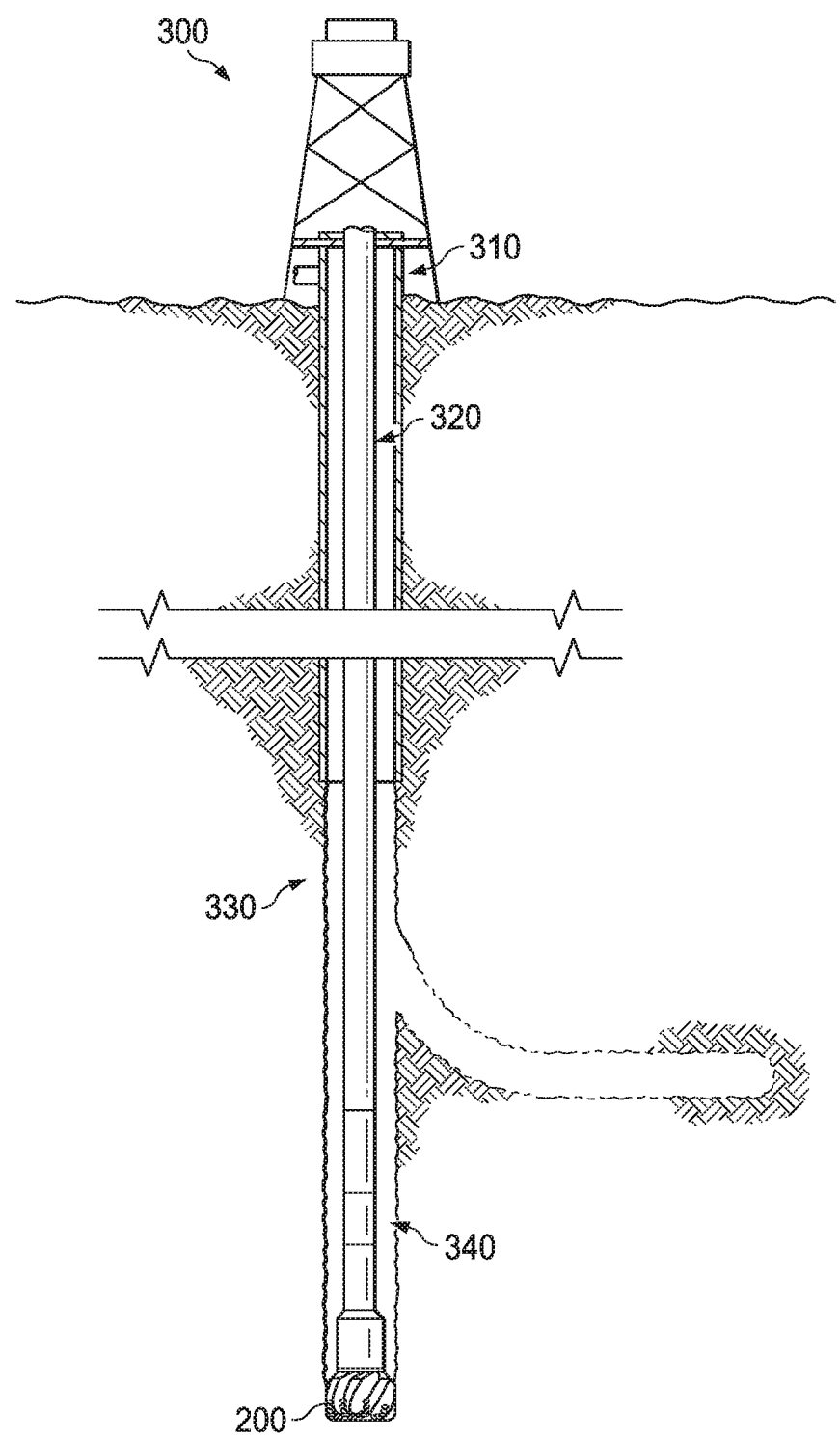
FIG. 5 is a schematic drawing in section and in elevation with portions broken away showing examples of wellbores which may be formed by a roller cone drill bit incorporating teachings of the present disclosure.

FIG. 5 is a schematic drawing in elevation and in section with portions broken away of wellbores or boreholes which may be formed in a formation by roller cone drill bits incorporating teachings of the present disclosure. Various aspects of the present disclosure may be described with respect to a drilling rig 300 located at well surface 310. Various types of drilling equipment such as a rotary table, mud pumps and mud tanks (not expressly shown) may be located at well surface 310. Drilling rig 300 may have various characteristics and features associated with a land drilling rig. However, roller cone drill bits incorporating teachings of the present disclosure may be satisfactorily used with drilling equipment located on offshore platforms, drill ships, semi-submersibles and drilling barges (not expressly shown).

Roller cone drill bit 200 may be attached with the end of drill string 320 extending from well surface 310. Drill string 320 may apply weight to and rotate roller cone drill bit 200 to form wellbore 330. Drill string 320 may be formed from sections or joints of generally hollow, tubular drill pipe (not expressly shown). Drill string 320 may also include bottom hole assembly 340 formed from a wide variety of components. Drill string 320 and roller cone drill bit 200 may be used to form various types of wellbores and/or boreholes. For example, a directional or horizontal wellbore as shown in FIG. 5 in dotted lines, may be formed as an alternative to vertical wellbore 330.

The present disclosure is not limited to roller cone drill bits associated with conventional drill strings. In addition, although FIGS. 4 and 5 illustrate a drill bit having only cones, the present disclosure may also be used in hybrid bits which combine both cones and fixed cutters and/or blades.

The present disclosure provides an embodiment A relating to an roller cone drill bit journal including a ball race, a friction race, and a protuberance that extends the friction race into an area to be occupied by the ball race in a finished journal and that renders the ball race in the journal asymmetric.

The present disclosure provides an embodiment B relating to a method of forming a journal for a roller cone drill bit by forming a journal as described in embodiment A, welding bearing material to the friction race using a weld pool, and removing the protuberance and any weld pool or bearing material located on or in the protuberance to form a symmetric ball race.

In addition, embodiments A and B may be used in conjunction with the following additional elements, which may also be combined with one another unless clearly mutually exclusive, and which method elements may be used to obtain devices and which device elements may result from methods: i) a weld pool may be located on or within the protuberance; ii) a weld pool and bearing material may be located on the friction race; iii) the protuberance may be circular or ovoid in cross-section; iv) the protuberance may be angular in cross-section; v) the protuberance may extend into the ball race of the journal by up to 90% of the diameter of the ball race in the finished journal; vi) the protuberance may extend into the ball race of the journal by at least 0.05% of the diameter of the ball race in the finished journal; vii) the protuberance may be circular or ovoid in cross-section; viii) the protuberance may be angular in cross-section; ix) the protuberance may extend into the ball race of the journal by up to 90% of the diameter of the ball race in the finished journal; x) the protuberance may extend into the ball race of the journal by at least 0.05% of the diameter of the ball race in the finished journal; xi) during welding, the weld pool may be placed on top of the protuberance; xii) during welding, the weld pool may melt at least a portion of the protuberance; xiii) during welding, the weld pool may replace at least a portion of the protuberance; xiv) during welding, the weld pool may reach a temperature sufficiently high to damage the ball race if the weld pool contacts the ball race; xv) during welding, the weld pool may not contact the ball race; xvi) the bearing material may be at least 1% thicker along the at least an area of the friction race than in an otherwise identical bit with no protuberance; xvii) the bearing material may be at least 1% thicker along the entire friction race than in an otherwise identical bit with no protuberance; xviii) machining may be use to remove the protuberance and any weld pool or bearing material located on or in the protuberance.

Although the present disclosure and its advantages have been described in detail, it should be understood that various changes, substitutions and alternations can be made without departing from the spirit and scope of the disclosure.

What is claimed is:

1. A method of forming a journal for a roller cone drill bit, the method comprising:
   forming an unfinished journal defining an unfinished ball race and an unfinished friction race adjacent to the unfinished ball race, the unfinished friction race comprising a protuberance extending from the unfinished friction race into an area for receiving retaining balls to be defined by a finished ball race to be formed;
   forming a bearing on the unfinished friction race comprising welding a welded bearing material to the unfinished friction race using a weld pool that expands onto, removes, and/or damages some of the protuberance; and
   forming the finished ball race defining the area for receiving the retaining balls, comprising machining the unfinished journal to remove at least a portion of the protuberance and any of the weld pool or the welded bearing material located on or in the protuberance.

2. The method of claim 1, wherein a remaining portion of the protuberance of the finished ball race is circular or ovoid in cross-section.

3. The method of claim 1, wherein the protuberance of the unfinished friction race is angular in cross-section.

4. The method of claim 1, wherein the protuberance extends into the area by up to 90% of a diameter of the finished ball race in the finished journal.

5. The method of claim 1, wherein the protuberance extends into the area by at least 0.05% of a diameter of the finished ball race in the finished journal.

6. The method of claim 1, wherein, during the welding, the weld pool contacts the unfinished ball race.

7. The method of claim 1 wherein, during the welding, the weld pool melts at least a portion of the protuberance.

8. The method of claim 1, wherein, during the welding, the weld pool replaces at least a portion of the protuberance.

9. The method of claim 1 wherein, during the welding, the weld pool reaches a temperature sufficiently high to damage the unfinished ball race if the weld pool contacts the unfinished ball race.

10. The method of claim 1, wherein, during the welding, the weld pool does not contact the unfinished ball race.

* * * * *